United States Patent
Tanner (10) Patent No.: US 8,813,944 B2
(45) Date of Patent: Aug. 26, 2014

(54) DEVICE FOR SORTING OUT INCORRECTLY POSITIONED CYLINDRICAL BODIES IN A SEPARATING AND CONVEYING UNIT

(75) Inventor: Marcel Tanner, Bassersdorf (CH)

(73) Assignee: M. Tanner AG, Illnau (CH)

( * ) Notice: Subject to any disclaimer, the term of this patent is extended or adjusted under 35 U.S.C. 154(b) by 68 days.

(21) Appl. No.: 13/514,875

(22) PCT Filed: Nov. 10, 2010

(86) PCT No.: PCT/CH2010/000282
§ 371 (c)(1),
(2), (4) Date: Sep. 18, 2012

(87) PCT Pub. No.: WO2011/069268
PCT Pub. Date: Jun. 16, 2011

(65) Prior Publication Data
US 2013/0001139 A1    Jan. 3, 2013

(30) Foreign Application Priority Data
Dec. 11, 2009    (CH) ..................................... 1911/09

(51) Int. Cl.
*B65G 43/08* (2006.01)
*B65G 47/256* (2006.01)

(52) U.S. Cl.
CPC .................... *B65G 47/256* (2013.01)
USPC ............................ 198/395; 198/398; 198/389

(58) Field of Classification Search
USPC ......... 198/395, 398, 382, 390, 389, 392, 401, 198/454, 396, 444, 399; 209/707
See application file for complete search history.

(56) References Cited

U.S. PATENT DOCUMENTS

| | | | |
|---|---|---|---|
| 3,506,840 A * | 4/1970 | Fink ........................... | 250/223 B |
| 6,968,936 B2 * | 11/2005 | Charpentier .................. | 198/389 |
| 7,322,458 B1 * | 1/2008 | McDonald et al. ........... | 198/389 |
| 8,151,970 B2 * | 4/2012 | McDonald et al. ........... | 198/389 |
| 8,522,956 B2 * | 9/2013 | Tanner ........................... | 198/395 |
| 2008/0226763 A1 * | 9/2008 | Charpentier .................. | 425/534 |

FOREIGN PATENT DOCUMENTS

| | | |
|---|---|---|
| CA | 2131849 | 9/1994 |
| DE | 60118772 | 5/2007 |
| EP | 0647500 | 4/1995 |
| EP | 1679238 | 7/2006 |
| JP | 4101927 | 4/1992 |
| JP | 6345244 | 12/1994 |
| JP | 2004/244185 | 9/2004 |
| WO | WO-00/23254 | 4/2000 |
| WO | WO-2008/016688 | 2/2008 |
| WO | WO-2009/068121 | 6/2009 |

OTHER PUBLICATIONS

International Search Report and Opinion for PCT/CH2010/000282.

* cited by examiner

*Primary Examiner* — Kaitlin Joerger
(74) *Attorney, Agent, or Firm* — Notaro, Michalos & Zaccaria P.C.

(57) ABSTRACT

A separating and conveying unit in which a device for sorting out incorrectly positioned cylindrical bodies, such as for hollow bodies, is arranged. The device has a roller sorter with rollers and air nozzles arranged laterally adjacent the rollers. Incorrectly positioned cylindrical bodies are blown out of the roller sorter by the air nozzles. The air nozzles can be pivoted and at least one of the air flows escaping from the air nozzles is directed at the cylindrical body at an angle of attack.

7 Claims, 6 Drawing Sheets

DEVICE FOR SORTING OUT INCORRECTLY POSITIONED CYLINDRICAL BODIES IN A SEPARATING AND CONVEYING UNIT

The invention relates to a device for sorting out incorrectly positioned cylindrical bodies, such as preforms for hollow bodies, in a singling and conveying unit, wherein the cylindrical bodies have a head with a collar, said device including a roller sorter which has two rollers, which are arranged in parallel in the conveying direction and are spaced apart from each other, between which the cylindrical bodies are positioned in a suspended manner, and including an ejecting device by means of which cylindrical bodies which are incorrectly positioned between the rollers are removed out of the device, wherein the ejecting device has air nozzles arranged laterally next to the rollers for blowing away incorrectly positioned cylindrical bodies.

Usually speaking, cylindrical bodies, such as preforms of PET bottles, also called parisons, are supplied as unit loads in an unsorted manner in large containers and are guided to a singling device by means of a charging device. The singling device sets the preforms upright and forms a single row of preforms which leaves the singling device, for example, by means of a chute directed inclinedly downward, also called a run-off rail. From there the preforms pass to testing and conveying devices and finally to a stretch blowing machine where their cylindrical body is inflated to form a desired bottle shape. Typically, the preforms have a head at an open end with a screw neck and a collar or supporting ring which has a larger diameter than the remaining cylinder part of the preform.

DE 601 18 772 T2 describes a singling device for preforms which is realized as a roller conveyor or roller sorter. It has two rollers which are arranged spaced apart from each other and are arranged on the funnel-shaped base of an elongated container. The rollers rotate about their longitudinal axes and form a conveying path which usually runs at a slight gradient. The preforms are conveyed in a guided manner in a single row one behind the other by means of said roller conveyor. To this end, they are supported on the rollers by way of their collars, as a result of the force of gravity their bodies hang freely downward with the cylinder part in the gap between the rollers. Preforms which do not take up the correct position and consequently project beyond a predetermined height, are flung away by means of a rotating kick wheel or back-force wheel out of the conveying path and pass into a rear region of the roller conveyor or into an overflow region, from where they are conveyed again into a feed container of the roller conveyor. As a result of the high conveying capacity of such singling devices, a very high degree of reliability and freedom from disturbances is demanded in order to avoid downtimes in the subsequent production system with corresponding consequential costs. In the case of the known device, for example, preforms which are supported by way of their collar on a collar of an adjacent preform or preforms which lie horizontally on the gap between the rollers cannot be picked up and are ejected. As a result, disturbances and consequently operating interruptions occur in the subsequent regions of the system. It is obvious that the reliability of said known singling devices does not meet the high demands and further improvement in the operational reliability is necessary.

Practical applications and International Patent Application No. PCT/CH 2009/000256 make known a device by way of which preforms which are supported by way of their collar on a collar of an adjacent preform or preforms which lie horizontally on the gap between the rollers can be detected and sorted out or removed. Said device has sensors, for example optical sensors or ultrasound sensors which can detect and sort out incorrectly positioned preforms. The sorting out is effected, in this case, by means of an ejecting device which is arranged below the roller sorter or roller conveyor and engages in the space between the rollers by way of an ejecting means and removes incorrectly positioned preforms. In addition, air nozzles are arranged at the level of the top edge of the two rollers of the roller conveyor, the air flow from said air nozzles acting approximately at right angles with respect to the conveying direction of the preforms in the roller conveyor. In this case, the air flow is activated by the sensors and preforms supported by the rollers or preforms ejected by the discharging means are reliably blown away from the roller conveyor and are sorted into a collecting device arranged to the side thereof. Said device already results in a very high degree of reliability and freedom from disturbances as almost all variants of incorrectly positioned preforms can be picked up and sorted out. Difficulties can still occur when preforms are supported by the rollers such that they do not present sufficient working area to the air flow. This problem occurs, in particular, in the case of the preforms with large head diameters, for so-called wide-necked containers, which are used increasingly in modern times.

It is consequently the object of the invention to create a device for sorting out incorrectly positioned cylindrical bodies, such as preforms for hollow bodies, which eliminates the abovementioned disadvantages. The invention is to ensure, in particular, that incorrectly positioned preforms which up to now have not been able to sorted out are to be detected with a high degree of reliability and automatically sorted out or ejected. In addition, the device is to be adaptable in a simple manner to different forms of preforms.

This object is achieved as claimed in the invention in conjunction with the preamble of claim 1 in that at least one air nozzle is aligned such that the axis of flow of the air flow emerging from the nozzle is directed approximately transversely with respect to the conveying direction of the cylindrical bodies and is directed at an angle of attack against the head of the cylindrical bodies and that the air nozzle is fastened so as to be pivotable and the angle of attack of the axis of flow of the air flow is adjustable in relation to the head of the cylindrical bodies.

Using this device as claimed in the invention, in particular so-called nested preforms, which are certainly positioned in a suspended manner but in this case several preforms are fitted into each other, can be separated from each other and/or blown out. Said problem occurs more and more in the case of preforms with large head diameters, also called wide-neck preforms, the solution as claimed in the invention preventing disturbances in the operating sequence caused by such incorrect positions. However, blowing out and sorting out is also possible when such preforms with large head diameters, or wide-neck preforms, are supported on the rollers and the thin cylindrical end of the preforms does not present sufficient resistance to the air flow, in the case of previously known solutions. The picking up of incorrectly positioned preforms is effected, in this case, by optoelectronic sensors which activate an ejecting device and/or the air nozzles in conjunction with a control device.

An advantageous design of the object of the invention provides that the cross section of the air flow emerging from the air nozzle has an elongated form and the width of the cross section directed in the conveying direction of the cylindrical bodies has a larger dimension than the height of the cross section directed approximately at right angles thereto. This development of the cross section of the air flow, which emerges from the air nozzle, enables the different shapes of the preforms to be picked up in a better manner and creates a larger airflow force on the surface of the preforms acted upon by the air flow. Consequently, the certainty of the sorting out of incorrectly positioned preforms can be increased. In addition, the certainty that an incorrectly positioned preform is picked up by the air flow is increased as the preform requires a certain time to be moved by the elongated air flow in the conveying direction.

A further design of the invention provides that, when viewed in the conveying direction of the cylindrical bodies, several air nozzles are arranged one after the other, at least in the case of a first nozzle the axis of flow of the air flow is aligned approximately parallel to an imaginary plane placed through the axes of the two conveying rollers and the axis of flow of the air flow of at least one second nozzle is aligned at a positive angle of attack, in an inclined manner with respect to said imaginary plane. This development increases the certainty of the sorting out of incorrectly positioned preforms also additionally by preforms, which as a result of their position on the rollers or their path of movement through the ejecting device are situated outside the inclined air flow, being picked up and sorted out by the air flow which is arranged parallel with respect to the imaginary roller plane.

As claimed in the invention it is further proposed that the air nozzle has several air outlet openings which are arranged next to one another in the conveying direction of the cylindrical bodies and the overall width of the cross section of the air flow emerging from said openings is at least twice as large as the height of the air flow. The achievement of this embodiment is that the form of the cross section of the air flow can be modified by developing the number of openings and/or the form thereof in a variable manner. This enables the certainty of the blowing out of incorrectly positioned preforms to be improved.

A further expedient development of the object of the invention provides that at least one deflecting element is arranged above the rollers of the roller sorter and in the contact region of the collars of the cylindrical bodies on said conveying rollers, wherein the longitudinal axis of said deflecting element is directed in an inclined manner in opposition to the conveying direction of the cylindrical bodies and that the end of said deflecting element directed in opposition to the conveying rollers does not contact the conveying rollers. In an expedient manner, the longitudinal axis of the deflecting element encloses an angle of 30-60° with the longitudinal axis of one of the conveying rollers and the deflecting element is a round rod with a conical end. Said deflecting element supplements the air nozzles and the ejecting device in an advantageous manner. When preforms are supported by the rollers approximately at right angles with respect to the conveying direction and at the same time the head of the preform lies inclinedly in the space between the rollers, the picking up of such an incorrectly positioned preform is made more difficult by the air flow. Such an incorrectly positioned preform pushes against the deflecting element on account of the conveying movement and, as a result, is moved into another position in which it can be picked up and ejected in a better manner by the air flow.

A further design of the invention provides that an optoelectronic sensor with a control device for the ejecting device is arranged above the roller sorter and, when viewed in the conveying direction, in front of the ejecting device with the blow-out device and the discharging device. In this case, sensors which are known per se and are able to establish the shape and position of the preforms and incorrectly positioned preforms in an optical manner are used. As soon as an incorrectly positioned preform is detected, an error signal is generated and the control device sets the ejecting device in operation, until the incorrectly positioned preform is sorted out and removed. Other sensors, such as ultrasound sensors or mechanical detectors, are also conceivable in place of an optoelectronic sensor.

The above-described devices are suitable, in principle, not only for sorting out preforms, but also all oblong unit loads which have a supporting or carrying ring or a contact surface or a collar.

The invention is explained below in more detail by way of exemplary embodiments with reference to the attached drawings, in which, in each case in a schematic representation.

The references used in the drawings and the meaning thereof are listed together in the list of references. In principle, identical parts are provided with identical references in the figures.

Figure 1:
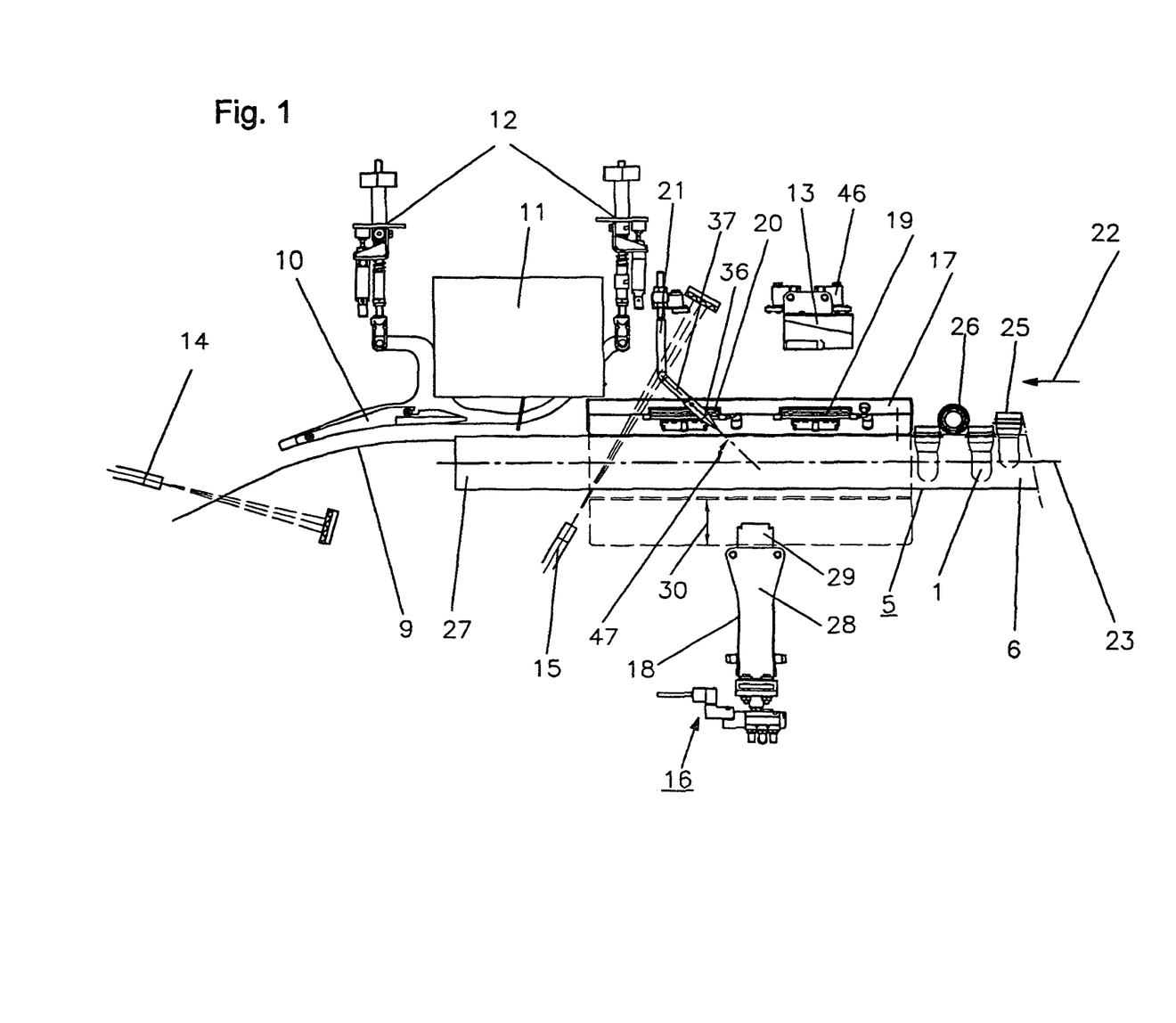
FIG. 1 shows a side view of a device as claimed in the invention for sorting out incorrectly positioned preforms.

FIG. 1 shows a cutout from a device for charging an automatic production line for hollow bodies with preforms. A part region of the singling and conveying device in the region of the device for sorting out incorrectly positioned cylindrical bodies or preforms 1 is shown. The preforms 1 are conveyed through the device in the conveying direction 22 by means of a roller sorter or roller conveyor 5. The feeding of the preforms 1 onto the roller sorter 5 is effected by means of a charging device (not shown). The roller sorter 5 includes two rollers 6, 7 which are arranged parallel with respect to each other and are arranged spaced apart from each other and rotate about the axes 23, 24. In the region shown of the roller sorter 5, the preforms 1 are singled out and incorrectly positioned preforms 25, 26 are sorted out and removed from the roller sorter 5. At the end region 27 of the roller sorter 5, the singled-out and correctly aligned preforms 1 are transferred to run-off rails 9, on which they are conveyed to a fashioning device for the hollow bodies (not shown either). An optoelectronic sensor 13 is arranged above the roller sorter 5, by way of which sensor the shape and position of the preforms 1 conveyed through the device in the conveying direction 22 is detected. The optoelectronic sensor 13 can be supplemented or replaced by other sensors, such as for example, light beam barriers or ultrasound sensors. When viewed in the conveying direction 22, an ejecting device 16 for incorrectly positioned preforms 1 or 25, 26 is arranged downstream of the optoelectronic sensor 13. Said ejecting device 16 includes a discharging device 18 and a blow-out device 17. The discharging device 18 is arranged under the roller sorter 5 and consists of a pneumatic or hydraulic cylinder 28 with an ejector rod 29. Said ejector rod 29 is movable in the direction of the arrows 30 and engages in the space (gap) 8 between the rollers 6 and 7. The cylinder 28 is actuated by the sensor 13, by means of a control device 46, as soon as an incorrectly positioned preform 1 or 25, 26 is detected, as a result of which the ejector rod 29 extends and discharges the incorrectly positioned preform, for example 26, from the roller sorter 5.

The blow-out device 17, which has two air nozzles 19, 20 in the example described, is arranged in a side region of the roller sorter 5. Said air nozzles 19, 20 are also actuated by the control device 46 which is connected to the sensor 13 and an air flow is created as soon as an incorrectly positioned preform 1 or 25, 26 is conveyed into the region of the blow-out device 17 and/or a preform 1 is discharged out of the roller sorter 5 by means of the ejector rod 29. In this case, the axis 32 of the air flow 31, which emerges out of the air nozzle 19, is aligned inclinedly with respect to an imaginary plane 35, which runs through the two axes 23, 24 of the rollers 6, 7 (see FIG. 4). The axis 34 of the air flow 33, which emerges from the air nozzle 20, is aligned parallel with respect to said imaginary plane 35 (see FIG. 5). Further details on the arrangement of the air nozzles 19 and 20 are described in relation to FIGS. 4 and 5.

A deflecting element 21 is additionally arranged above the roller sorter 5. Said deflecting element 21 is connected fixedly to the structure of the device at one end, the other end 36 directed against the roller sorter 5 being free and being at a small spacing to one of the transport rollers 6, 7. The axis 37 of the deflecting element 21 is arranged inclinedly with respect to the axes 23, 24 of the conveying rollers 6, 7 and encloses an angle 47 between 30-60°, preferably 45°, with said axes.

Downstream of the ejecting device 16, when viewed in the conveying direction 22, is a height guide 10 which is combined with a back-force wheel or a kick wheel 11. Said device is used to pick up incorrectly positioned preforms 1 which assume an unusual incorrect position in such a manner that they were not able to be picked up by the preceding ejecting devices 16. The height guide 10 is provided with lifting devices 12, as a result of which it can be raised upward. Associated with said device 12 and the height guide 10 are the two light beam barriers 14 and 15, by means of which is ascertained whether a build-up of preforms 1 has formed in the region of the height guide 10. The light beam barriers 14 and 15, in this case, are aligned onto the space 8 between the rollers 6, 7 or the run-off rails 9 and establish whether preforms are present in this region. If preforms 1 are present in the region of the light beam barrier 15, but not in the region of the light beam barrier 14, the height guide 10 is raised temporarily in order to eliminate the build-up. Preforms 1 that are possibly causing problems are thrown back by the kick wheel 11 into the rear region of the roller sorter 5.

Figure 2:
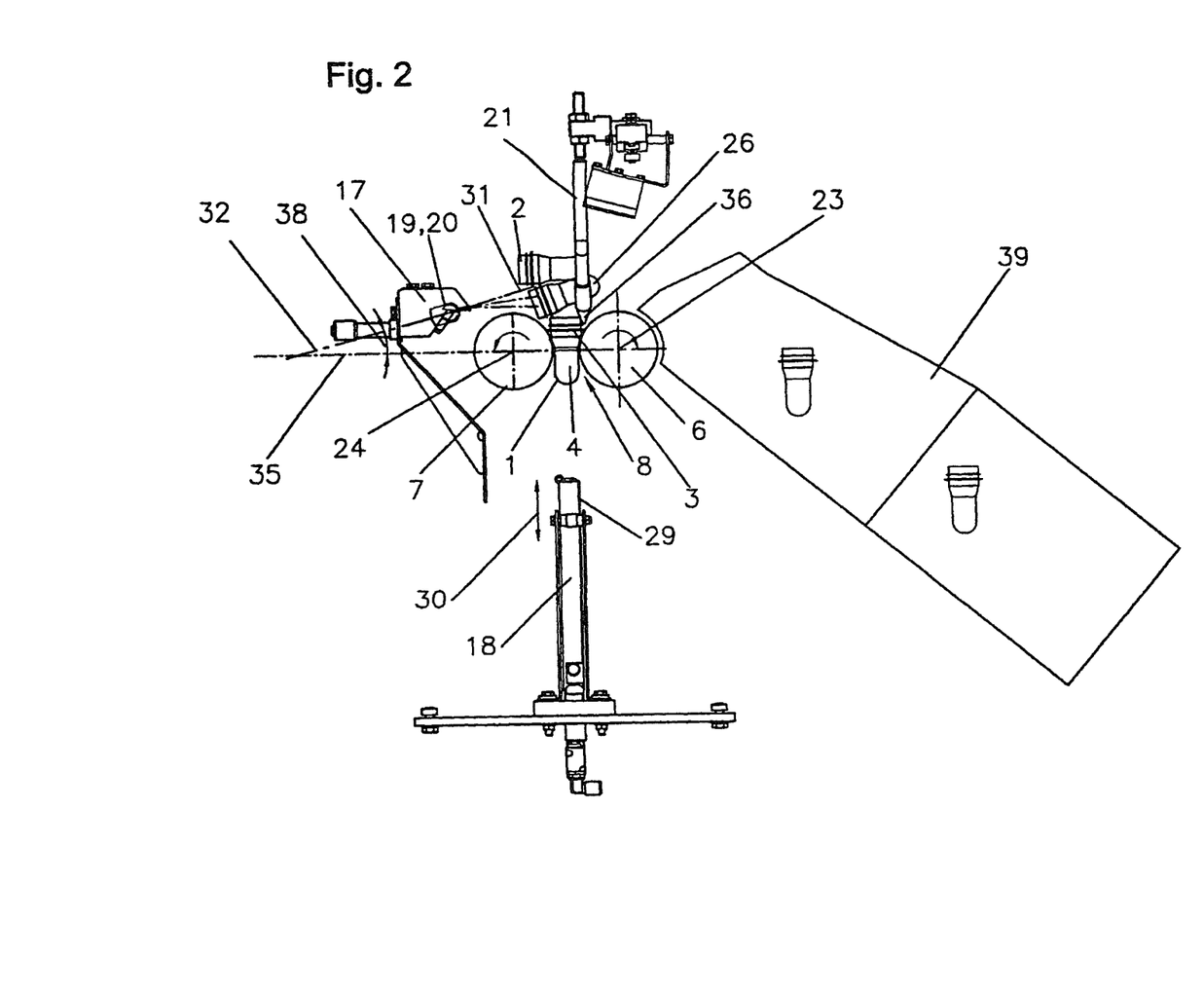
FIG. 2 shows a cross section through the device in the region of the air nozzles when viewed in opposition to the conveying direction.

FIG. 2 shows a cross section through the sorting device and the roller sorter 5 in front of the region of the ejecting device 16 and viewed in opposition to the conveying direction 22. It can be seen in this representation that the preforms 1 have a cylinder part 4, a collar 3 which has a larger diameter than the cylinder part 4 and a head 2 with a thread. Correctly positioned preforms 1 are supported by way of their collar 3 on the lateral surface of the rollers 6 and 7 and the cylinder part 4 hangs downward on account of the force of gravity. So that this is possible, there is a spacing or space 8 between the rollers 6, 7. The rollers 6, 7, in this case, rotate in opposite directions toward each other. The blow-out device 17 is arranged in the side region next to the roller sorter 5 or next to the roller 7. Said blow-out device 17 contains the two nozzles 19 and 20 and possibly also even more nozzles, as well as compressed air connections and control valves (not shown). When the nozzle 19 is activated, an air flow 31 exits out of the nozzle, the axis 32 of said air flow being aligned in an inclined manner. In this case, the axis 32 encloses an angle 38 with an imaginary plane 35, which is placed through the axes 23, 24 of the two rollers 6, 7. Said angle 38 is adjustable and can be adapted to the geometrical requirements of differently formed preforms 1. A collecting device 39 for the sorted-out and blown-out preforms is arranged on the side of the roller sorter 5 opposite the blow-out device 17.

FIG. 2 shows an incorrectly positioned preform 1 in a position as occurs more and more in the case of preforms which are used for so-called wide-neck bottles and the head 2 and the collar 3 have a large diameter in relation to the diameter of the cylinder part 4. When the travel of the ejector rod 29 of the discharging device 18 does not go far enough upward, said preform 26 is not pushed upward by the ejector rod 29, but is just picked up by the air flow 31 and blown away. However, it has been shown that in individual cases in particular preforms with large head and collar diameters are supported by the rollers 6, 7 such that they do not present sufficient working area to the air flow 31. The deflecting element 21, on which these types of preforms 26 stand and are deflected into another position, is arranged in order, nevertheless, to be able to sort out and blow out these types of preforms 26. In the deflected position, they can be picked up and blown out either by means of the air flow 31 of the nozzle 19 or by means of the air flow 33 of the following nozzle 20.

Figure 3:
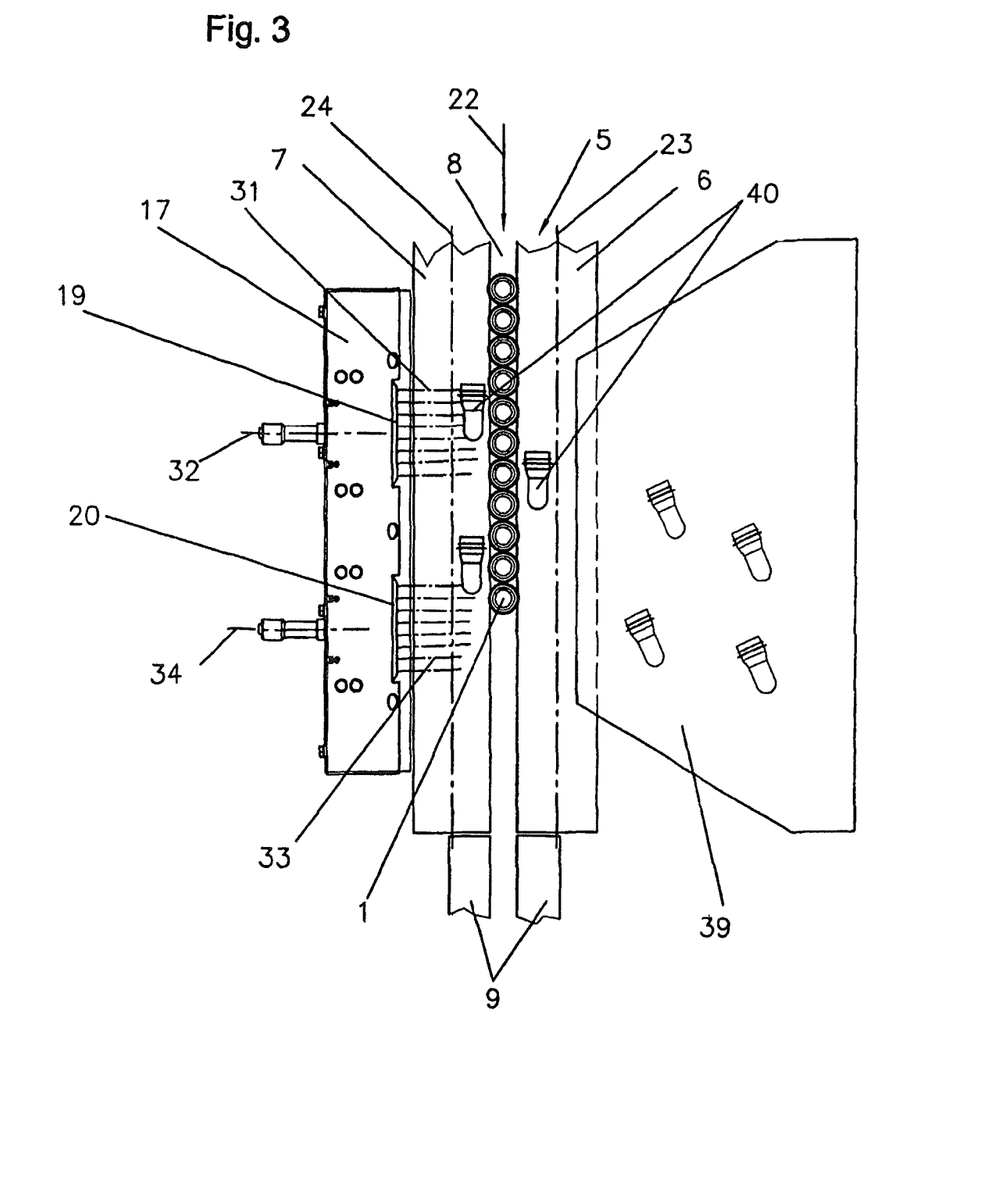
FIG. 3 shows a top view onto the roller sorter in the region of the air nozzles.

FIG. 3 shows the region of the ejecting device 16 when seen in a simplified view from above. This representation shows two incorrectly positioned preforms 40 which are supported on the rollers 6, 7 parallel with respect to the axes 23, 24 of said rollers and to the correctly arranged preforms 1. Such incorrectly positioned preforms 40 cannot be discharged by the discharging device 18 and the ejector rod 29 in this position. However, they are picked up by the air flow 31 of the first nozzle 19 or then by the air flow 33 of the second nozzle 20 and are blown out into the collecting device 39. Otherwise they stand in line at the height guide 10 after being conveyed further in the conveying direction 22 and are picked up and thrown back by the kick wheel 11. It can also be seen in this representation that the two air flows 31 and 33 of the two nozzles 19 and 20, when viewed in the conveying direction 22, have a larger dimension than transversely with respect thereto. Through said forming of the cross section of the two air flows 31 and 33, a larger working area is picked up on the preforms 1 and incorrectly positioned preforms 25, 26 and 40 are exposed to the two air flows 31 and 33 for a longer period when they are conveyed in the conveying direction 22.

Figure 4:
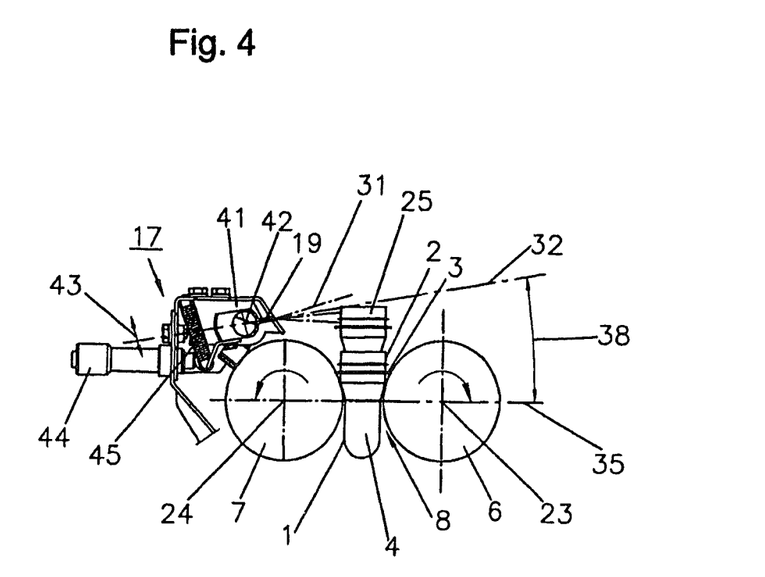
FIG. 4 shows a schematic representation of an adjustable air nozzle with an inclined axis of the air flow.

FIG. 4 shows a cross section in the region of the air nozzles 19 with the adjusting device for the angle of attack 38 of the air flow 31. In addition, incorrectly positioned preforms 25 are shown in this representation, two preforms are fitted inside each other, i.e. are so-called nested. This incorrect arrangement also occurs in the case of preforms with a large head and collar diameter more frequently than in the case of preforms with a normal diameter. As the axis 32 of the air flow 31, which emerges from the air nozzle 19, is set inclinedly at the angle 38, the collar 3 of the top of the nested preforms 25 is blown on from below by the air flow 31. In this case, the working area for the air flow 31 at the collar 3 is large enough in order to lift the top preform 25 out of the bottom one and to blow it away. The air nozzle 19 is fastened on a holder 41 and is pivotable about an axis of rotation 42 in the direction of the arrows 43. The angle 38, which the axis 32 of the air flow 31 forms with respect to the imaginary plane 35, can be adjusted by means of an adjusting device 44. A restoring spring 45 holds the air nozzles 19 in the desired and adjusted inclined position.

Figure 5:
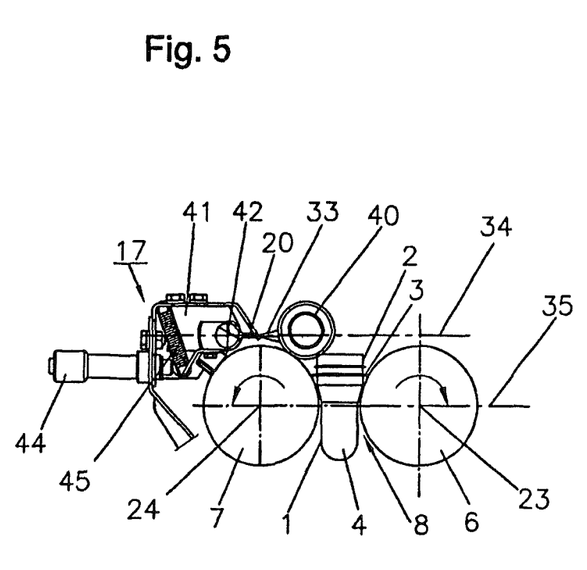
FIG. 5 shows a schematic representation of an adjustable air nozzle with a parallel axis of the air flow and FIG. 6 shows a perspective representation of an air nozzle with several air outlet openings.

FIG. 5 shows the same elements as in FIG. 4, but in a cross section in the region of the air nozzle 20. Said air nozzle 20 is adjusted such that the axis 34 of the air flow 33 runs approximately parallel with respect to the imaginary plane 35. In this representation an incorrectly positioned preform 40 lies parallel on the roller 7 and the correctly positioned preforms 1. When the axis 34 of the air flow 33 runs parallel with respect to the imaginary plane 35 or is set at only a small angle of attack with respect to said plane 35, the air flow 33 can pick up and blow out the incorrectly positioned preform 40 better than the air nozzle 19 which is set inclinedly at a larger angle 38.

Figure 6:
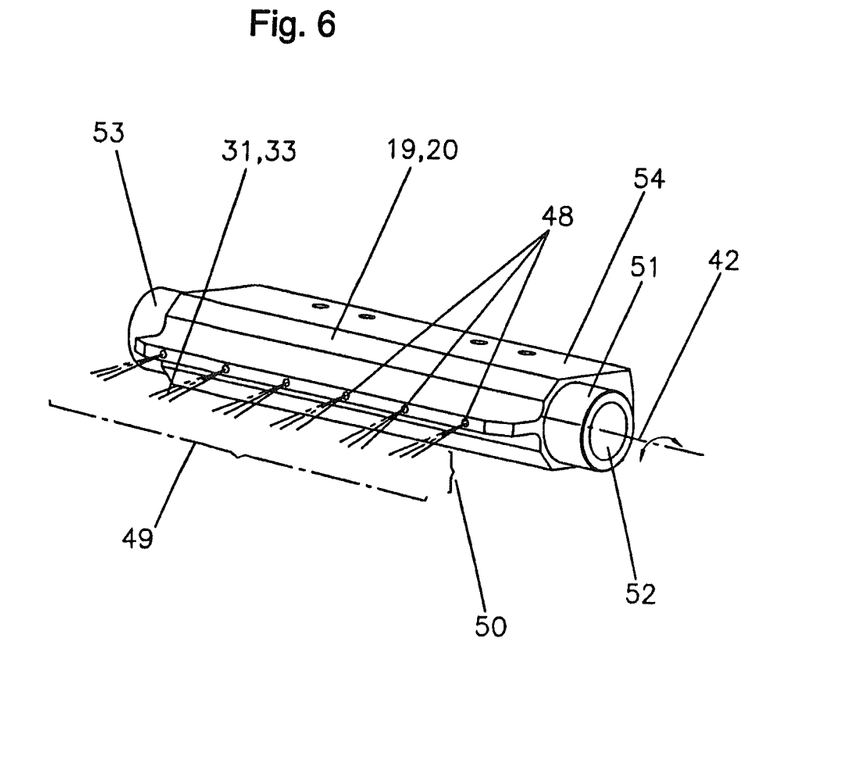

FIG. 6 shows one of the two identically realized air nozzles 19 or 20. Several air outlet openings 48 are arranged on the front side of the air nozzles 19, 20, five in the example shown. This arrangement creates an air flow 31 or 33, the cross section of which has an overall width 49, which is larger than the height 50 of said cross section. In this case, the width 49 of the cross section is to be at least twice as large as the height 50 thereof. In an expedient manner, the overall width 49, as in the example shown, is a multiple of the height 50. Bearing journals 51, 53, on which the air nozzles 19, 20 are mounted so as to be pivotable about the axis 42 are arranged on the side regions of the air nozzles 19, 20. The associated pivoting device is described in relation to FIGS. 4 and 5. The housing 54 of the air nozzles is hollow and is connected to a compressed air line (not shown) by means of an air supply 52 in the bearing journal 51. When required, the air nozzles 19, 20 are supplied with compressed air by means of said compressed air line and the air supply 52, said compressed air then exiting by means of the air outlet openings 48 and forming the air flow 31 or 33. The control of the compressed air supply is effected by means of the control device 46 shown in FIG. 1.

LIST OF REFERENCES

| | |
|---|---|
| 1 | Cylindrical body/preform |
| 2 | Head (1) |
| 3 | Collar (1) |
| 4 | Cylinder part |
| 5 | Roller sorter |
| 6 | Roller (3) |
| 7 | Roller (5) |
| 8 | Gap (6/7)/space |
| 9 | Run-off rail |
| 10 | Height guide |
| 11 | Back-force wheel/kick wheel |
| 12 | Lifting device (10) |
| 13 | Optoelectronic sensor |
| 14 | Light beam barrier |
| 15 | Light beam barrier |
| 16 | Ejecting device |
| 17 | Blow-out device |
| 18 | Discharging device |
| 19 | Air nozzle (inclined) |
| 20 | Air nozzle (horizontal) |
| 21 | Deflecting element |
| 22 | Conveying device |
| 23 | Axis (6) |
| 24 | Axis (7) |
| 25 | Incorrectly positioned preform |
| 26 | Incorrectly positioned preform |
| 27 | End region (5) |
| 28 | Cylinder (18) |
| 29 | Ejector rod (18) |
| 30 | Arrows (29) |
| 31 | Air flow (19) |
| 32 | Axis (31) |
| 33 | Air flow (20) |
| 34 | Axis (33) |
| 35 | Imaginary plane (23/24) |
| 36 | End (21) |
| 37 | Axis (21) |
| 38 | Angle (31/35) |

LIST OF REFERENCES -continued

| | |
|---|---|
| 39 | Collecting device |
| 40 | Incorrectly positioned preform |
| 41 | Holder (19) |
| 42 | Axis of rotation (19/20) |
| 43 | Arrows |
| 44 | Adjusting device |
| 45 | Restoring spring |
| 46 | Control device |
| 47 | Angle (37/23, 24) |
| 48 | Air outlet openings |
| 49 | Overall width (31/33) |
| 50 | Height (31/33) |
| 51 | Bearing journal (19/20) |
| 52 | Air supply (51) |
| 53 | Bearing journal (19/20) |
| 54 | Housing (19/20) |

The invention claimed is:

1. A device for sorting out incorrectly positioned out cylindrical bodies (1), such as preforms for hollow bodies, in a singling and conveying unit, wherein the cylindrical bodies (1) have a head (2) with a collar (3), said device comprising: a roller sorter (5) which has two rollers (6, 7), which are arranged in parallel in the conveying direction (22) and are spaced apart from each other, between which the cylindrical bodies (1) are positioned in a suspended manner, and an ejecting device (16) by means of which cylindrical bodies (1) which are incorrectly positioned between the rollers (6, 7) are removed out of the device, wherein the ejecting device (16) has air nozzles (19, 20) arranged laterally next to the rollers (6, 7) for blowing away incorrectly positioned cylindrical bodies (1), wherein at least one air nozzle (19) is aligned such that the axis of flow (32) of the air flow (31) emerging from the nozzle (19) is directed approximately transversely with respect to the conveying direction (22) of the cylindrical bodies (1) and is directed at an angle of attack (38) against the head (2) and collar (3) of the cylindrical bodies (1), wherein the air nozzle (19) is fastened so as to be pivotable and the angle of attack (38) of the axis of flow (32) of the air flow (31) is adjustable in relation to the head (2) and the collar (3) of the cylindrical bodies (1), and wherein the axis of flow of the at least one air nozzle is aligned at a positive angle of attack in an inclined manner with respect to an imaginary plane placed through the axes of the two conveying rollers wherein, when viewed in the conveying direction (22) of the cylindrical bodies, several air nozzles (19, 20) are arranged one after the other, at least in the case of a first nozzle (20) the axis of flow (34) of the air flow (33) is aligned approximately parallel to the imaginary plane (35) placed through the axes (23, 24) of the two conveying rollers (6, 7).

2. The device as claimed in claim 1, wherein the cross section of the air flow (31) emerging from the air nozzle (19) has an elongated form and the width (49) of the cross section directed in the conveying direction (22) of the cylindrical bodies (1) has a larger dimension than the height (50) of the cross section directed approximately at right angles thereto.

3. A device for sorting out incorrectly positioned out cylindrical bodies (1), such as preforms for hollow bodies, in a singling and conveying unit, wherein the cylindrical bodies (1) have a head (2) with a collar (3), said device comprising: a roller sorter (5) which has two rollers (6, 7), which are arranged in parallel in the conveying direction (22) and are spaced apart from each other, between which the cylindrical bodies (1) are positioned in a suspended manner, and an ejecting device (16) by means of which cylindrical bodies (1) which are incorrectly positioned between the rollers (6, 7) are removed out of the device, wherein the ejecting device (16) has air nozzles (19, 20) arranged laterally next to the rollers (6, 7) for blowing away incorrectly positioned cylindrical bodies (1), wherein at least one air nozzle (19) is aligned such that the axis of flow (32) of the air flow (31) emerging from the nozzle (19) is directed approximately transversely with respect to the conveying direction (22) of the cylindrical bodies (1) and is directed at an angle of attack (38) against the head (2) and collar (3) of the cylindrical bodies (1), wherein the air nozzle (19) is fastened so as to be pivotable and the angle of attack (38) of the axis of flow (32) of the air flow (31) is adjustable in relation to the head (2) and the collar (3) of the cylindrical bodies (1), and wherein the axis of flow of the at least one air nozzle is aligned at a positive angle of attack in an inclined manner with respect to an imaginary plane placed through the axes of the two conveying rollers;

wherein the air nozzle (19, 20) has several air outlet openings (48) which are arranged next to one another in the conveying direction (22) of the cylindrical bodies (1) and the overall width (49) of the cross section of the air flow (31, 33) emerging from said openings (48) is at least twice as large as the height (50) of the air flow (31, 33).

4. A device for sorting out incorrectly positioned cylindrical bodies (1), such as preforms for hollow bodies, in a singling and conveying unit, wherein the cylindrical bodies (1) have a head (2) with a collar (3), said device comprising: a roller sorter (5) which has two rollers (6, 7), which are arranged in parallel in the conveying direction (22) and are spaced apart from each other, between which the cylindrical bodies (1) are positioned in a suspended manner, and an ejecting device (16) by means of which cylindrical bodies (1) which are incorrectly positioned between the rollers (6, 7) are removed out of the device, wherein the ejecting device (16) has air nozzles (19, 20) arranged laterally next to the rollers (6, 7) for blowing away incorrectly positioned cylindrical bodies (1), wherein at least one air nozzle (19) is aligned such that the axis of flow (32) of the air flow (31) emerging from the nozzle (19) is directed approximately transversely with respect to the conveying direction (22) of the cylindrical bodies (1) and is directed at an angle of attack (38) against the head (2) and collar (3) of the cylindrical bodies (1), wherein the air nozzle (19) is fastened so as to be pivotable and the angle of attack (38) of the axis of flow (32) of the air flow (31) is adjustable in relation to the head (2) and the collar (3) of the cylindrical bodies (1), and wherein the axis of flow of the at least one air nozzle is aligned at a positive angle of attack in an inclined manner with respect to an imaginary plane placed through the axes of the two conveying rollers;

wherein at least one deflecting element (21) is arranged above the rollers (6, 7) of the roller sorter (5) and in the contact region of the collars (3) of the cylindrical bodies (1) on said conveying rollers (6, 7), wherein the longitudinal axis (37) of said deflecting element (21) is directed in an inclined manner in opposition to the conveying direction (22) of the cylindrical bodies (1) and in that the end (36) of said deflecting element (21) directed in opposition to the conveying rollers (6, 7) does not contact the conveying rollers (6, 7).

5. The device as claimed in claim 4, wherein the longitudinal axis (37) of the deflecting element (21) encloses an angle (47) of 30-60° with the longitudinal axis (23 or 24) of one of the conveying rollers (6, 7).

6. The device as claimed in claim 4, wherein the deflecting element (21) is a round rod with a conical end (36).

7. The device as claimed in claim 1, wherein an optoelectronic sensor (13) with a control device (46) for the ejecting devices (16, 17, 18) is arranged above the roller sorter (5) and, when viewed in the conveying direction (22), in front of the ejecting device (16), with the blow-out device (17) and the discharging device (18).

* * * * *